(12) United States Patent
Dinant et al.

(10) Patent No.: US 11,285,786 B2
(45) Date of Patent: Mar. 29, 2022

(54) OUTLET DEVICE

(71) Applicant: FAURECIA INTERIEUR INDUSTRIE, Nanterre (FR)

(72) Inventors: Bruno Dinant, Saint-Brice sous forêt (FR); Thanh-Tu Bui, Saint-Ouen l'aumône (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 292 days.

(21) Appl. No.: 16/421,776

(22) Filed: May 24, 2019

(65) Prior Publication Data
US 2019/0359034 A1    Nov. 28, 2019

(30) Foreign Application Priority Data

May 28, 2018   (DE) ..................... 10 2018 004 264.3

(51) Int. Cl.
*B60H 1/34*  (2006.01)
(52) U.S. Cl.
CPC ... *B60H 1/3428* (2013.01); *B60H 2001/3471* (2013.01)
(58) Field of Classification Search
CPC ... B60H 1/3428; B60H 1/3435; B60H 1/3442
USPC .............................. 454/154, 305, 155
See application file for complete search history.

(56) References Cited

U.S. PATENT DOCUMENTS

| | | | |
|---|---|---|---|
| 3,802,328 A * | 4/1974 | Kakizaki ............. | B60H 1/3442 454/154 |
| 9,370,986 B2 | 6/2016 | Londiche et al. | |
| 2010/0014959 A1* | 1/2010 | Azzouz ............... | B60H 1/3435 415/126 |
| 2015/0336445 A1* | 11/2015 | Uehara ............... | B60H 1/3442 454/155 |

* cited by examiner

*Primary Examiner* — Vivek K Shirsat
(74) *Attorney, Agent, or Firm* — Reising Ethington P.C.

(57) ABSTRACT

An outlet device for ventilating a vehicle interior by generating an outlet flow, the outlet device including: a housing with an inner housing surface, a central body which is rotatably mounted on the housing, wherein the central body has a first air-guide surface for generating a first partial volume flow and a second air-guide surface for generating a second partial volume flow, wherein the second air-guide surface lies contrary to the first air-guide surface, and a first arrangement of fins and a second arrangement of fins, wherein the fins of the first and second arrangement of fins are rotatably mounted on the central body and wherein the vertical fins of the first arrangement extend from the first air-guide surface and the fins of the second arrangement extend from the second air-guide surface.

10 Claims, 9 Drawing Sheets

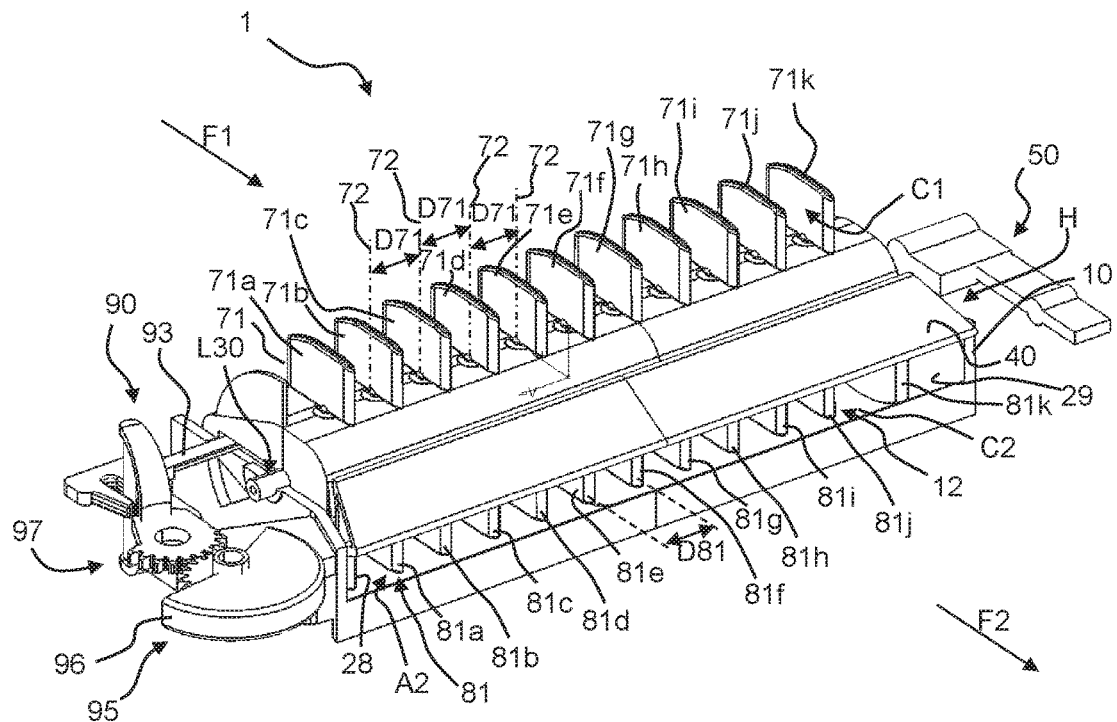
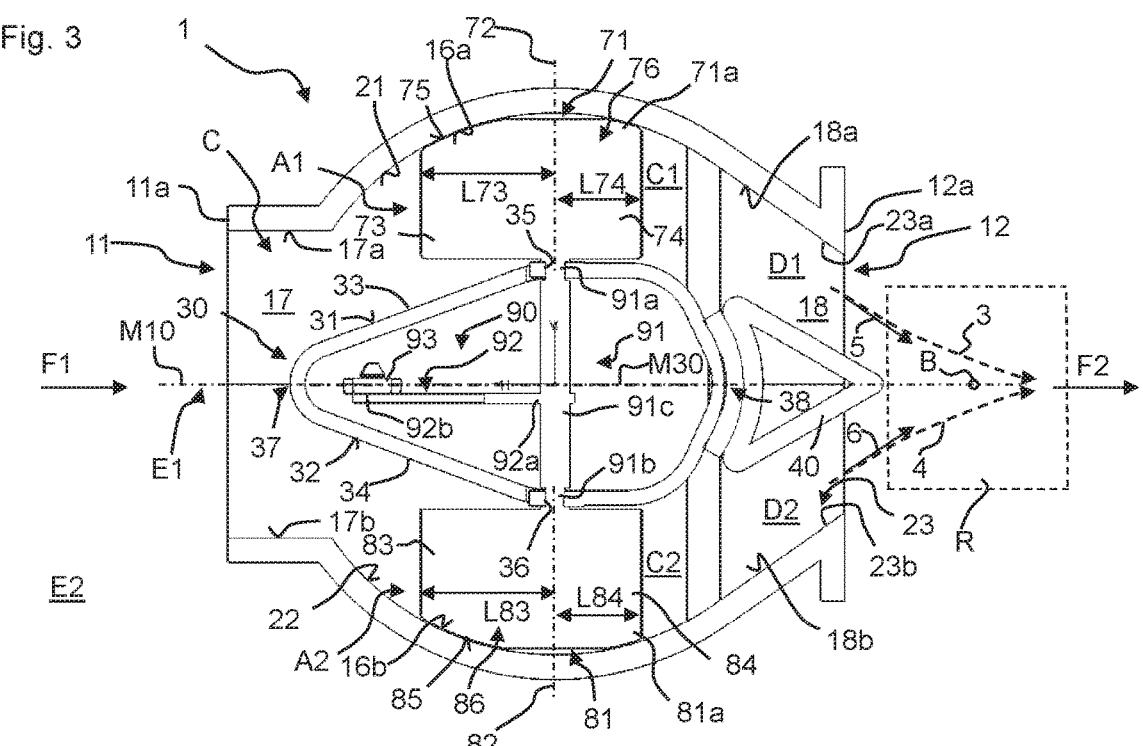
Fig. 3
Fig. 4

OUTLET DEVICE

TECHNICAL FIELD

The invention relates to an outlet device for ventilating a vehicle interior.

BACKGROUND

From U.S. Pat. No. 9,370,986 B2 a vent nozzle is known.

SUMMARY

It is an object of the invention to provide an exhaust device for introducing air into a vehicle interior, which is formed by a relatively simple construction and which allows different designs.

These objects may be achieved by the features of claim 1. Further embodiments are given in the subclaims.

According to one aspect of the invention, an outlet device is provided for ventilating a vehicle interior by generating an outlet flow, the outlet device comprising:

a housing which extends along a housing centerline between an air inlet opening and an air outlet opening and which comprises a first inner surface section and a second inner surface section opposite thereto with regard to a first reference plane, a central body which is rotatably mounted to the housing and is rotatable around a central body rotation axis running along the first reference plane, wherein the central body comprises a first air-guide surface and a second air-guide surface which is oriented contrary to the first air-guide surface, wherein the first and second air-guide surfaces each extend along a central body center line, wherein the first air-guide surface lies opposite to the first inner surface section and forms with the same a first sub-channel which defines a first partial volume flow direction which exits at the air outlet opening, wherein the second air-guide surface lies opposite to the second inner surface section and forms with the same a second sub-channel which defines a second partial volume flow direction which exits at the air outlet opening, wherein the first partial volume flow direction and the second partial volume flow direction meet each other in an intersection area lying behind the central body when viewed from the air inlet opening, a first arrangement of at least one fin each of which extends from the first air-guide surface and is rotatably hinged to the central body with being rotatable around a first fin rotation axis which extends from the first air-guide surface, a second arrangement of at least one fin each of which extends from the second air-guide surface and is rotatably hinged to the central body with being rotatable around a second fin rotation axis which extends from the second air-guide surface.

The first and second arrangement of at least one fin is configured to change the direction of an inlet air flow. More particularly, the fins are configured to direct the air flow in a direction that is parallel to or lies within the first reference plane.

The first fin rotation axis or the first rotation axes of the at least one fin of the first arrangement may extend from the first air-guide surface towards the first inner surface section. In particular, the first fin rotation axis or the first rotation axes of the at least one fin of the first arrangement may run transversely to a plane spanned by the central body center line and the central body rotation axis.

The second fin rotation axis or the first rotation axes of the at least one fin of the second arrangement may extend from the second air-guide surface towards the second inner surface section. In particular, the second fin rotation axis or the second fin rotation axes of the at least one fin of the second arrangement may run transversely to a plane spanned by the central body center line and the central body rotation axis.

The housing of the outlet device may comprise an inner housing surface which forms a channel which extends between an air inlet opening and an air outlet opening. Further the housing may comprise a first sidewall section and a second sidewall section interconnecting the first and second inner surface sections and facing each other.

According to an embodiment of the outlet device according to the invention, it can be provided that the first fin rotation axis and the second fin rotation axis run parallel or co-axial to each other.

In these embodiments, it may in particular be provided that a respective fin which extends from the first air-guide surface and a respective fin which extends from the second air-guide surface are disposed at respective end parts of an axle in a non-rotational manner, wherein the axle extends transversely to the central body rotation axis and is rotatably coupled to the central body.

In these embodiments, it may in particular be provided that from each of at least two axles an adjustment lever protrudes, thereby forming an off-axis end portion, wherein the end portions of the adjusting levers are coupled to a connecting rod in order to synchronously rotate the fins.

Alternatively, it can be provided in particular in these embodiments that the connecting rod in an extension region, in which the connecting rod is coupled to the adjustment lever, extends within the central body.

According to an embodiment of the outlet device according to the invention, it can be provided:

that multiple fins of the first arrangement each have a fin edge section facing the first inner surface section, wherein the first inner surface section comprises a fin movement section which covers the range of movement of the fin edge section in all rotational positions of both the fins and the center body and which is concavely curved as seen from the inside of the housing forming a concave bulge along which the fin edge sections of the respective fin move within its range of movement upon rotation of the central body around the central body rotation axis, that multiple fins of the second arrangement each have a fin edge section facing the second inner surface section, wherein the second inner surface section comprises a fin movement section which covers the range of movement of the fin edge section in all rotational positions of both the fins and the center body and which is concavely curved as seen from the inside of the housing forming a concave bulge along which the fin edge sections of the respective fin move within its range of movement upon rotation of the central body around the central body rotation axis.

According to an embodiment of the outlet device according to the invention, it can be provided that the first air-guide surface and the second air-guide surface of the central body are each formed in a convex manner in the direction of view from outside the central body.

According to an embodiment of the outlet device according to the invention, it can be provided that the housing comprises an inlet section with the air inlet opening and an outlet section with the air outlet opening, wherein the first inner surface section in the outlet section comprises a first end portion at the air outlet opening and the second inner surface section of the outlet section comprises a second end portion at the air outlet opening, wherein the fictive extensions of the first and second end portions particularly beyond the air outlet opening are directed towards each other.

According to an embodiment of the outlet device according to the invention, it can be provided that the outlet device comprises a central body adjustment device which is coupled to the central body for rotating the central body around the central body rotation axis.

According to an embodiment of the outlet device according to the invention, it can be provided that the central body extends transversely across the entire housing interior from a first side wall section to a second side wall section which lies opposite to the first side wall section, and is rotatable relative to the side wall sections and particularly rotatably coupled to the side wall sections.

According to an embodiment of the outlet device according to the invention, it can be provided:

that the central body comprises an end which faces the outlet opening and which is located in a distance from the outlet opening over which distance an outlet section extends, and that a flow separator device is disposed in the outlet section and extends as an extension from the central body in order to separate the air flow of the first sub-channel from the air flow of the second sub-channel in the area of the outlet section.

According to an embodiment of the outlet device according to the invention, it can be provided that the outlet device comprises a closing flap which is rotatably mounted in the housing and which is rotatable around an adjustment flap rotation axis running along the first reference plane and transversely to the housing center line.

According to an aspect of the invention, an external air flow resulting from the deflection of two colliding flows from two air sub-channels is provided. The outlet device may be configured such that, due to an inlet flow, within the outlet device two flows or two partial flows are formed each in respective sub-channels, wherein the two partial flows, are directed towards each other, in particular at an acute angle and especially at an angle between 80 degrees and 40 degrees, preferably at an angle between 70 degrees and 60 degrees in an end section of the housing or after exiting the housing and deflect each other. The two flows are two partial volume flows of an air inlet flow separated from one another by the central body. The direction of the outer air flow after the mutual deflection of the two partial volume flows depends on the respective amounts of air flow provided by the sub-channels, which are influenced by the angular position of the central body in the housing. In case that the flows or volume flows provided by the two sub-channels are equal to each other, the resultant direction of both partial volume flows after the mutual deflection of the two partial volume flows is a middle or neutral direction along the first reference plane. In case that the flow rate in a first of both sub-channels is less than the volume flow in the respective second sub-channel, the outside air flow, which results after the mutual deflection of the two partial volume flows, has a direction which, when viewed in the extension of the first reference plane, is directed to the side on which the respective first of the both sub-channels is located.

The central body is constructed and arranged in the housing such that the rotational position of the central body determines the ratio between the two partial volume flows. More in particular the central body may in a specific position close the first sub-channel so that there is only an air flow through the second sub-channel. This results in an outer air flow that is directed along the fictive extension of the second end portion at the air outlet opening. Similarly, the central body may in another specific position close the second sub-channel so that there is only an air flow through the first sub-channel. This results in an outer air flow that is directed along the fictive extension of the first end portion at the air outlet opening.

According to an embodiment of the outlet device according to the invention, when viewed in a plan view on the second reference plane, the extensions of flow contour lines or inner edge contour lines of the inner surface sections which exist at the location of the air outlet opening, meet in a deflection area or an intersection area B which lies on the first reference plane E1. In particular, the outlet device may be designed such that the position of the intersections of these lines is located at a minimum distance from the air outlet opening which is a tenth and especially a quarter of the smallest diameter of the inner housing surface at the air outlet opening.

Herein, the term "along" with respect to a reference direction or a reference axis, particularly in connection with the indications of a specific direction or specific axis generally, means that the specific direction or axis deviates locally at least with a maximum angle of 45 degrees, and preferably by a maximum angle of 23 degrees, from the reference direction or reference axis.

Herein, the term "transverse" with respect to a reference direction or a reference axis, particularly in connection with the indications of a specific direction or specific axis generally, means that the specific direction or axis deviates locally by an angle that is between 45 degrees and 135 degrees, and preferably by an angle that is between 67 degrees and 113 degrees, from the reference direction or reference axis.

Herein, the end portion of the outlet flow channel is specifically defined to have a length that, when projected along the housing centerline, is particularly at maximum ½ and particularly at maximum 1/20 of the smallest diameter of the outlet opening at the second end.

BRIEF DESCRIPTION OF THE DRAWINGS

Embodiments of the invention will now be described with reference to the accompanying drawings, in which:

FIG. 3 shows a perspective view of the embodiment of the outlet device according to FIG. 2 without the housing, FIG. 4 shows a cross-sectional view of the embodiment of the outlet device according to FIG. 2, with the central body of the outlet device being in a neutral central body rotational position.

DETAILED DESCRIPTION

Figure 1:
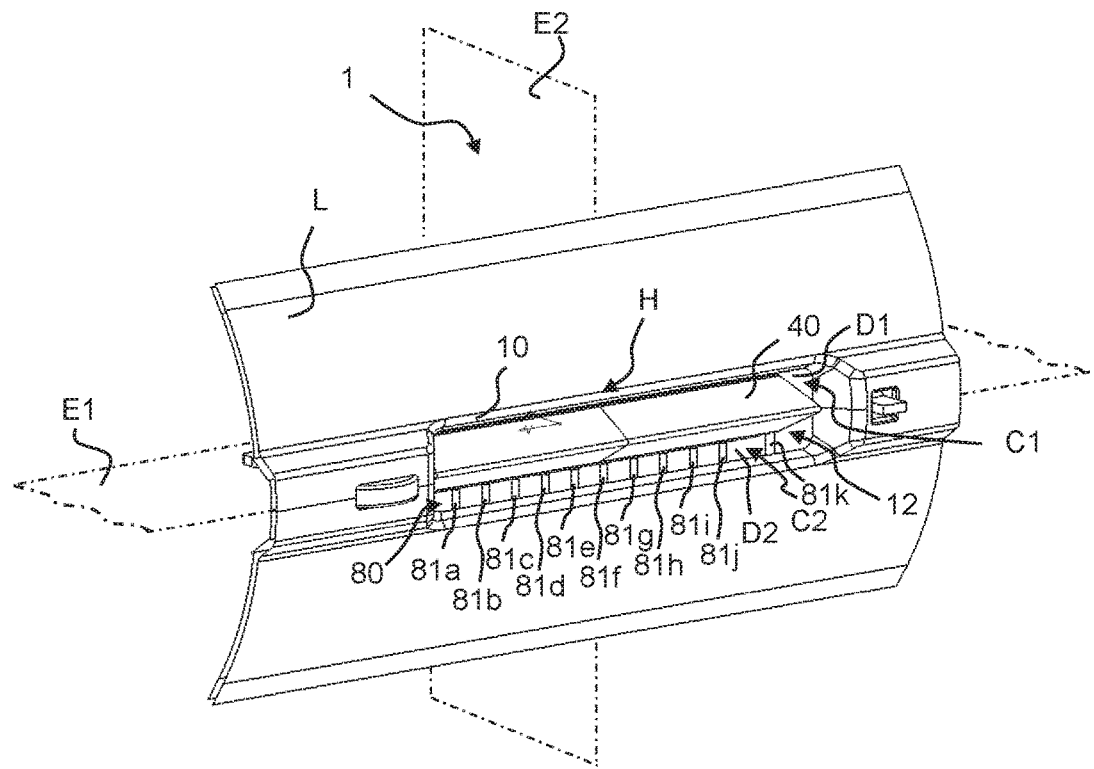
FIG. 1 shows a front view of the outlet device integrated in an instrument panel, wherein the outlet device comprises an air inlet opening, an air outlet opening and an inner housing surface extending between the same.

An embodiment of the exhaust device 1 according to the invention for ventilating a vehicle interior V is shown in FIGS. 1 to 11. The outlet device 1 comprises a housing device H comprising a housing 10 with an inner housing surface 10a which defines a housing interior or a main channel, in short a channel C which extends along a housing centerline M10 of the housing 10. The housing 10 with the channel C forms an air inlet opening 11 at a first axial end 11a of the housing 10 with regard to the housing centerline M10 and an air outlet opening 12 at a second axial end 12a of the housing 10, which is located opposite to air inlet opening 11 when viewed in the direction of the housing center line M10. The housing center line M10 may be defined as a connecting line of the centroids of the air inlet opening 11 and the air outlet opening 12. In this regard, the housing 10 has an inlet section 17 with an inlet section surface on its inner side and an outlet section 18 with an outlet section surface on its inner side, wherein the outlet section 18 is connected to the inlet section surface in the direction of view in the housing center line M10, i.e. is fluidically connected with the same. The inlet section surface, which forms the first axial end 11a with the air inlet opening 11, and the outlet section surface, which has the second axial end 12a with the air outlet opening 12, form the inner casing surface 10a. The inlet section 17 forms the air inlet opening 11 and the outlet section 18 forms the air outlet opening 12, which is situated in the direction of the housing center line M10 of the housing 10 opposite the air inlet opening 11.

In particular, the outlet section surface may be formed as an air-guide surface with a flow contour. Optionally, the inlet section surface may be formed as an air-guide surface with a flow contour.

The air inlet opening 11 can be designed in different ways. For example, the air inlet opening 11 seen in the housing center line M10 of the housing 10 may be oval or round or substantially rectangular, in particular rectangular with rounded corner edge portions, or elongated.

In each of the mentioned shapes of the air inlet opening 11, the air outlet opening 12 may be designed in different ways. For example, the air outlet opening 12 seen in the housing center line M10 of the housing 10 may be oval or round or substantially rectangular, in particular rectangular with rounded corner edge portions, or elongated.

The inner housing surface 10a comprises an end section 23 of the outlet section 18, which forms the air outlet opening 12. The end section 23 is formed by respective sections 23a, 23b opposing each other with respect to a first reference plane E1.

The extensions of the flow lines which are generated due to an inlet flow F1 and are projected onto the second reference plane E2 or inner edge contour lines of the inner surface sections 21, 22 running in the direction of the housing center line M10 respectively meet in an deflection area R or intersection area B onto the first reference plane E1, wherein the intersection point area B an particularly be located outside the housing 10 on the side of the air outlet opening 12. The second reference plane E2 extends in the direction of the housing center line M10 and vertically to the first reference plane E1. In connection with all embodiments of the invention, it may be provided that the deflection region R or intersection region B is typically located within a range of distances which extends from the air outlet opening which is at maximum ten times the smallest diameter the aft outlet opening 12. The deflection region R or intersection region B may also be located within the housing 10.

The outlet device 1 comprises a central body 30 with a first air-guide surface 31, which together with a first inner surface section 21 of the housing 10 which lies opposite to the first air-guide surface 31 forms a first sub-channel C1. Viewed from the air inlet opening 11 a first outlet subsection D1 of the housing interior or channel C is located behind the first sub-channel C1, wherein the end of the same which lies at the air outlet opening 12 forms a first portion of the air outlet opening 12 which may lie on a first side of the first reference plane E1. The central body 30 further comprises a second air-guide surface 32 which lies contrary to the first air-guide surface 31 and which together with a second inner surface section 22 of the housing 10 which lies opposite to the second air-guide surface 32 forms a second sub-channel C2 of the housing interior or channel C. Viewed from the air inlet opening 11 a second outlet subsection D2 of the housing interior or channel C is located behind the second sub-channel C2, wherein the end of the same which lies at the air outlet opening 12 forms a second portion of the air outlet opening 12 which may lie on a second side of the first reference plane E1.

The central body 30 comprises a first end 37 which faces the inlet opening 11 and a second end 38 which faces the outlet opening 12. The outlet device 1 may be configured such that the second end 38 is located in the direction of the housing center line A10 at a distance from the outlet opening 12. More in particular, the second end 38 is located before the outlet opening 12 when viewed in the direction of the inlet opening 11 to the outlet opening 12. In this case, the outlet section 18 can be defined so that it extends between the second end 38 and the outlet opening 12. It may be further provided that the first and the second outlet subsection D1, D2 are each located in the outlet section 18 and particularly form the same completely. The length of the outlet section 18 in the direction of the housing center line A10 can be between one-tenth and five times the smallest diameter of the inner housing surface at the air outlet opening 12.

For the central body 30 a central body center line M30 may be defined as a connecting line of the first end 37 and the second end 38. Additionally or alternatively, the central body center line M30 may be defined as a connecting line of the centroids of the smallest cross-sectional areas of the central body 30, which result in succession in the flow direction or an average straight line thereof.

The positions, which result by a direction which runs perpendicular to the housing center line M10, each of the inner surface sections 21, 22, in a projection of the same onto the second reference plane E2, define inner edge contour lines. In an analogous manner, the positions of the first and second air-guide surface 31, 32, which results by a direction which runs perpendicular to the housing center line M10, each of the first and second air-guide surfaces 31, 32, in a projection of the same onto the second reference plane E2, define outer edge contour lines. Accordingly, at each such location, a flow through the first sub-channel C1 or the second sub-channel C2 is a flow between in each case an inner and an outer edge contour line. Upon entry of an inlet flow F1 through the air inlet opening 11, a first partial volume flow flows through the first sub-channel C1 and a second partial volume flow flows through the second sub-channel C2. Thus, the first sub-channel C1 provides a first partial volume flow exiting at the air outlet opening 12 and the second sub-channel C2 provides a second partial volume flow exiting at the air outlet opening 12. Depending on the rotational position of the central body 30, one of the first or second partial volume flows might be absent despite an inlet flow F1, in case that the central body 30 is closing the respective sub-channel. In the case, that the second end 38 of the central body 30 is positioned in a distance to the outlet opening 12, in which the outlet section 18 is formed, upon entry of an inlet flow F1 the same flows through the air inlet opening 11 and a first partial volume flow of the same flows through the first sub-channel C1 and thereafter in the region of the outlet section 18 through the first outlet section D1 and a second partial volume flow of the same flows through the second sub-channel C1 and thereafter in the region of the outlet section 18 through the second outlet section D2.

In particular, the first inner surface portion 21 and the second inner surface portion 22 of the inner housing surface 10a of the housing 10 may be concavely curved at least in sections and in particular in the region of the outlet section 18 or the end portion 23 viewed from the housing center line M10, wherein the direction of the courses of the contour lines which run in the direction of the housing center line M10 are directed at an angle to the first reference plane E1 and are directed towards the same. The intersection point area B may also be defined such that the straight prolongations of the contour lines of the first inner surface portion 21 and of the second inner surface portion 22 met in the intersection point area B. As a result, the first and second partial volume flow exiting at the air outlet opening 12 are each given a direction at the air outlet opening 12 which runs at an angle to the first reference plane E1. As a result, the first sub-channel C1 or, if applicable, the first outlet sub-section D1 of the channel C defines a first partial volume flow or a first outlet flow component exiting at the air outlet opening 12 and the second sub-channel C2 or, if applicable, the second outlet sub-section D2 of the channel C defines a second partial flow or a second outlet flow component exiting at the air outlet opening 12 exiting, which respectively exit from the air outlet opening 12, depending of the rotational position of the central body 30, in different flow directions, which deflect each other in a deflection area R which may lie situated inside or outside the housing 10. Particularly, according to an embodiment of the outlet device 1 the intersection point area B can lie within the collision area R in all rotational positions of the central body 30.

Particularly in the case that the second end 38 of the central body 30 is positioned in a distance to the outlet opening 12, the outlet device 1 can comprise a flow separator device 40 which is disposed at the second end 38 of the central body 30 and which, as an extension of the central body 30, extends in the direction of the outlet opening 18 or even beyond the outlet opening 18, when seen from the central body 30. The flow separator device 40 has the function of separation the first outlet sub-section D1 from the second outlet sub-section D2 in the area of the outlet section 18 along a distance that among others is defined by the shape and dimensions of the flow separator device 40. The flow separator device 40 may be at a fixed position relative to the housing and the central body 30 may be movable relative to the flow separator device.

The first air-guide surface 31 is formed as an outer surface of the central body 30, which, together with the first inner surface section 21 of the housing 10 lying opposite thereto, forms the first sub-channel C1 of the channel C. Furthermore, the second air-guide surface 32 is formed as an outer surface of the central body 30, which, together with the second inner surface portion 22 of the housing 10 lying opposite thereto, forms the second sub-channel C2 of the channel C. The first and the second air-guide surface 31, 32 are outer surfaces of the central body 30, which are lying opposite to each other.

The central body 30 may be formed in particular as a hollow body. The central body 30 may be at least partially located in the outlet section 18 of the housing 10 with respect to the housing center line M10, i.e. viewed transversely thereto.

According to one embodiment of the central body 30, the same is formed as a displacement body, which is formed in a convex manner viewed in the viewing direction from outside the displacement body 30. In this case, the first and the second air-guide surface 31, 32 seen in the viewing direction from outside the displacement body 30 are formed in a convex manner.

In the embodiments of the outlet device 1, the central body 30 may extend transversely across the entire housing interior or the entire flow channel C transversely to the housing center line M10 and, in particular, along the first reference plane E1, i.e. from a first side wall portion 28 to a second side wall portion 29 which lies opposite thereto, and can be pivoted to the side wall portions 28, 29, so that thereby two separate sub-channels C1, C2 are formed in the housing interior.

In this regard, the housing 10 has an inlet section 17 with an inlet section surface on its inner side and an outlet section 18 with an outlet section surface on its inner side, wherein the outlet section 18 is connected to the inlet section surface in the direction of view in the housing center line M10, i.e. is fluidically connected with the same. The inlet section surface, which forms the first axial end 11a with the air inlet 11, and the outlet section surface, which has the second axial end 12a with the air outlet 12, form the inner casing surface 10a. The inlet section 17 forms the air inlet opening 11 and the outlet section 18 forms the air outlet opening 12, which is situated in the direction of the housing center line M10 of the housing 10 opposite the air inlet opening 11.

In the embodiments of the invention, in general, as can be seen in particular in FIGS. 1 to 4, the first inner surface portion 21 and the second inner surface portion 22 laterally interconnected via the side wall portions 28, 29, so that the inner surface portions 21, 22 and sidewall portions 28, 29 form the inner housing surface 10a. In particular, in the embodiments of the invention generally the inlet portion 17 may be formed of a first inlet surface section 17a and a second inlet portion section 17b which, with respect to the first reference plane E1, lie opposite to each other. In this case, the inlet surface sections 17a and 17b may be connected to each other laterally via the sidewall portions 28, 29 such that the entrance-portion surface portions 17a and 17b and the sidewall portions 28, 29 form the entrance portion 17. Similarly, in the embodiments of the invention generally the outlet portion 18 may be formed of a first outlet surface section 18a and a second outlet portion section 18b which, with respect to the first reference plane E1, lie opposite to each other. In this case, the outlet surface sections 18a and 18b may be connected to each other laterally via the sidewall portions 28, 29 such that the outlet surface sections 18a and 18b and the sidewall portions 28, 29 form the entrance portion 17.

The central body 30 is, by means of a central body pivot bearing L30, rotatably mounted in the channel C formed by the housing 10 and is rotatable around a first rotational axis running along the first reference plane E1. FIG. 3 shows a central body pivot bearing L30, which is formed in each case in the first side wall section 28 and the second side wall section 29.

Figure 2:
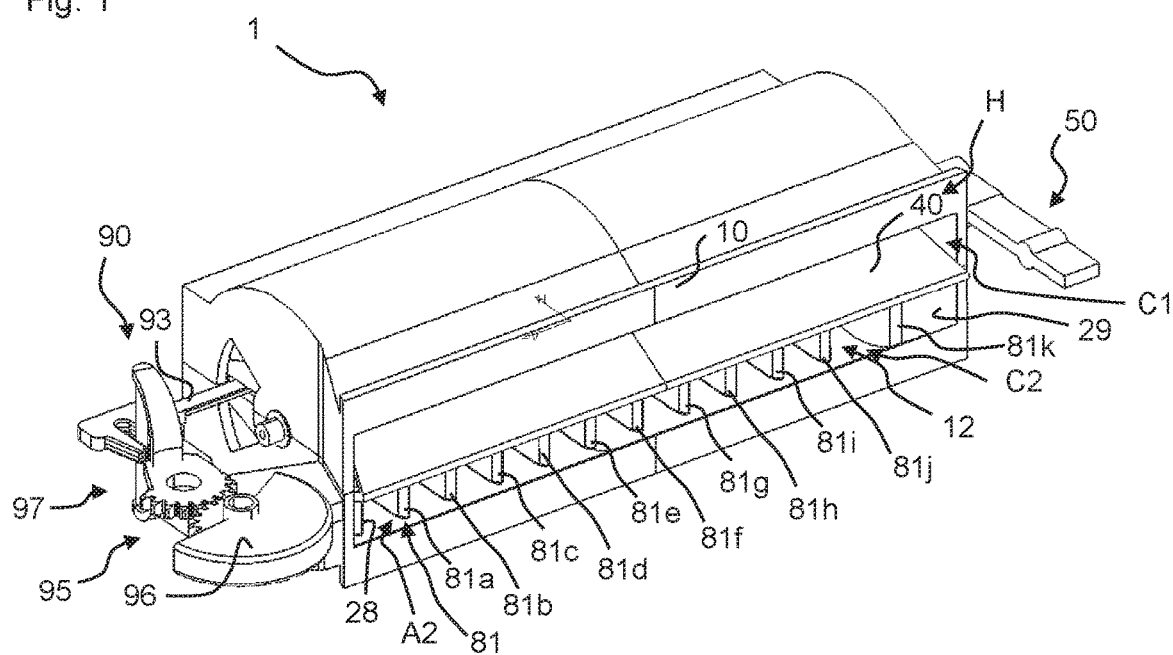
FIG. 2 shows a perspective view of an embodiment of the outlet device according to the invention with a housing, a central body and a plurality of vertical fins.

The outlet device 1 may comprise a first arrangement A1 of at least one fin and a second arrangement A2 of at least one fin. Herein, generally any fin of the first arrangement A1 the reference numeral "71" is assigned and any fin of the second arrangement A2 the reference numeral "81" is assigned. In the embodiment of FIGS. 2 and 3 the first arrangement A1 of at least one fin comprises the fins 71a, 71b, 71c, 71d, 71e, 71f, 71g, 71h, 71i, 71j, 71k that may be arranged in parallel. Each fin 71 of the first arrangement A1 of at least one fin extends from the first air-guide surface 31 and is hinged to the central body 30 with being rotatably around a first fin rotation axis 72. Because the fins are arranged at the central body 30, the fins will also rotate jointly with the central body when the central body 30 rotates around the central body rotation axis A30. The first fin rotation axis 72 may run transversely to the first reference plane E1 when the central body 30 is in the neutral position. Particularly, the first fin rotation axis 72 may run transversely to a plane spanned by the central body center line M30 and the central body rotation axis A30. In the embodiment of FIGS. 2 and 3 the second arrangement A2 of at least one fin comprises the fins 81a, 81b, 81c, 81d, 81e, 81f, 81g, 81h, 81i, 81j, 81k. Each fin 81 of the second arrangement A2 of at least one fin extends from the second air-guide surface 32 and hinged to the central body 30 with being rotatably around a second fin rotation axis 82. Because the fins are arranged at the central body 30, the fins will also rotate jointly with the central body 30 when the central body 30 rotates around the central body rotation axis A30. The second fin rotation axis 82 may run transversely to the first reference plane E1 when the central body 30 is in the neutral position. Particularly, the second fin rotation axis 82 may run transversely to a plane spanned by the central body center line M30 and the central body rotation axis A30.

According to an embodiment of the outlet device 1 the at least fin 71 or the fins 71a, 71b, 71c, 71d, 71e, 71f, 71g, 71h, 71i, 71j, 71k of the first arrangement A1 each may comprise a fin edge section 75 facing the first inner surface section 21. Further, the first inner surface section 21 may comprise a first fin movement section 16a which covers the range of movement of the fin edge section 75 in all rotational positions of both the fins and the center body 30 and which is concavely formed as seen from the inside of the housing 10 and thereby forms a concave bulge into which the fin edge section 75 of the respective fin extend. Thereby the fin edge section 75 of the respective fin 71 of the first arrangement A1 moves along the first fin movement section 16a in the range of movement of the respective fin 71 upon rotation of the central body 30 around the central body rotation axis A30.

According to a further embodiment of the outlet device 1 the at least fin 81 or the fins 81a, 81b, 81c, 81d, 81e, 81f, 81g, 81h, 81i, 81j of the second arrangement A2 each may comprise a fin edge section 85 facing the second inner surface section 22. Further, the second inner surface section 22 may comprise a second fin movement section 16b which covers the range of movement of the fin edge section 85 in all rotational positions of both the fins and the center body 30 and concavely formed as seen from the inside of the housing 10 and thereby forms a concave bulge into which the fin edge section 85 of the respective fin extend, Thereby the fin edge section 85 of the respective fin 81 of the second arrangement A2 moves along the second fin movement section 16b in the range of movement of the respective fin 81 upon rotation of the central body 30 around the central body rotation axis A30.

The fin rotation axis 72 of the at least one first fin 71 or of at least a portion of a plurality of first fins 71 or all of the first fins 71 of the first arrangement A1 of fins 71 may run in directions which differ from each other or run parallel to each other. Alternatively or additionally, the fin rotation axis 82 of the at least one second fin 81 or of at least a portion of a plurality of second fins 81 or all of the second fins 81 of the second arrangement A2 of fins 81 may run in directions which differ from each other or run parallel to each other.

A portion of the at least one first fin 71 or of the at least on second fin 81 or all the first or second fins may be articulated and supported by an axle piece 91a and 91b, respectively, by a respective wall section of the central body 30, which comprises the first air-guide surface 31 and the second air-guide surface 32, respectively.

According to a further embodiment of the invention, each of the at least one first fin 71 of the first arrangement A1 and each of the at least one second fin 81 of the second arrangement A2 are respectively connected to each other in pairs in a rotationally fixed manner via an axle 91. In each case a respective fin 71 of the first arrangement A1 which extends from the first air-guide surface 31 and a respective fin 81 of the second arrangement A2 which extends from the second air-guide surface 32 comprise a respective end part which are formed as axle pieces 91a, 91b of the axle 91. The same are connected to a respective flow-influencing part 76 and 86, respectively, of the respective fin 71 and 81, respectively, in a non-rotational manner. The axle piece 91a extends transversely to the extension of the first reference plane E1 and is rotatably coupled to the central body 30. Particularly, it may be provided as shown in FIG. 4 that each of the axle pieces 91a, 91b may be articulated and supported by a wall section 33 and 34, respectively, of the central body 30, which comprises the first air-guide surface 31 and the second air-guide surface 32, respectively. Specifically, it may additionally be provided that the axle pieces 91a, 91b in each case project through an opening 35 and 36, respectively, in the respective wall section 33 or 34 of the central body 30 and are thereby rotatably mounted in and articulated to the openings 35 and 36, respectively.

The axles 91 of the fins 71, 81 for synchronizing rotational movements may be components of a fin adjustment device 90, by which for each fin 71, 81 in a synchronized manner different rotational positions can be adjusted within a predetermined rotational position range. The embodiment of the fin adjustment device 90 shown in FIGS. 2 to 10 furthermore comprises an adjustment lever 92, each of which is non-rotatably connected with a first end 92a to in each case one axle 91 and in particular a middle section 91c thereof, so that each adjustment lever 92 protrudes from one axle 91. With a rotation of the axles 91 thus also rotates the adjustment lever 92 attached to a respective axle 91. The second ends 92b of the adjustment lever 92 respectively lying contrary to a first end 92a are each rotatably coupled to a connecting rod 93, which runs along the extension of the first reference plane E1 in order to rotate the fins 71, 81 synchronously with each other. In particular, it can be provided that, in case that the fin arrangements A1 and A2 each comprise several fins 71, 81, the adjustment levers 92 extend parallel to each other in their range of motion. Generally it may be provided according to the invention that from each of at least two axles 91 an adjustment lever 92 protrudes, wherein each of the end portions 92b of the adjusting levers 92 is coupled to the connecting rod 93.

An actuation device 95 for actuating the adjustment lever 92 can be coupled to the adjustment lever 92. The same or components of the same may be supported by a vehicle component such as e.g. a frame part or an interior trim part. An embodiment of the actuation device 95 is shown in FIG. 3 and FIGS. 6 to 8 in various states of actuation. The embodiment of the actuation device 95 shown in these figures comprises an operating part 96 for manual operation of the fin adjustment device 90 and a transmission device 97 which couples the operating part 96 to the adjustment lever 92. The operating part 96 may be, for example, a thumbwheel, a pointer or a slider. The operating part 96 may be mounted on a vehicle component. The transmission device 97 converts an actuated movement of the operating part 96 in a movement of the adjustment lever 92.

Figure 6:
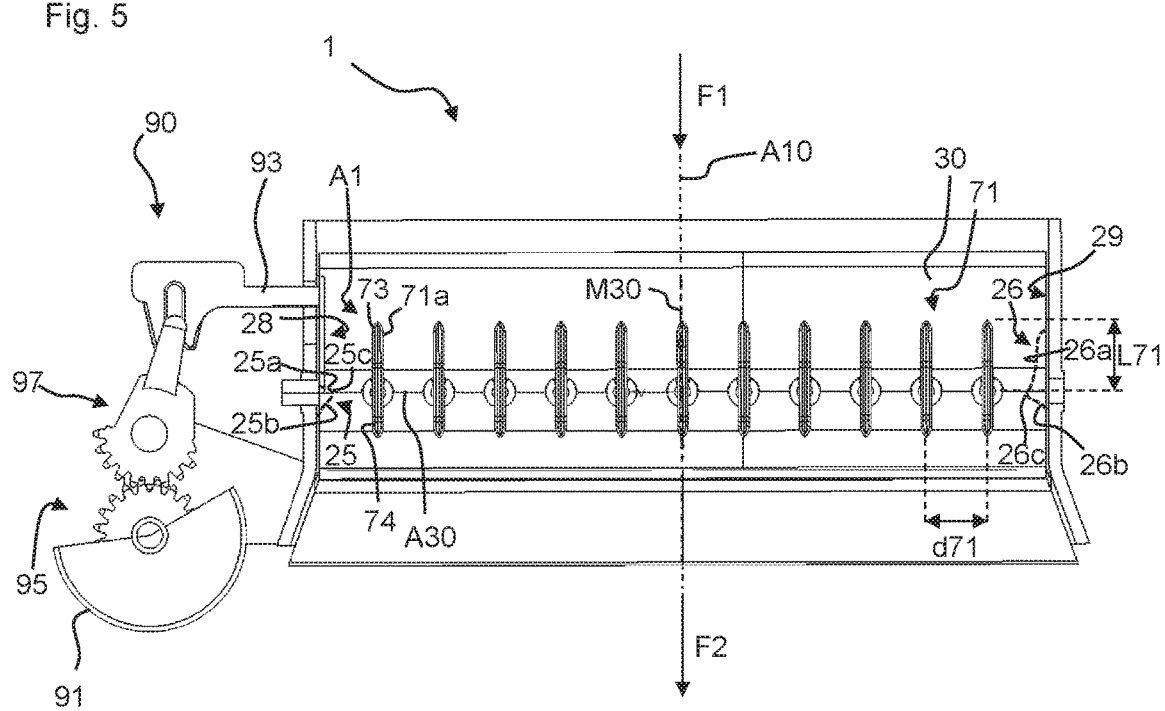
FIG. 6 shows a top view of the embodiment of the outlet device of FIG. 2 of the present invention, with the housing not shown and with the vertical fins in a neutral fin rotational position.
Figure 7:
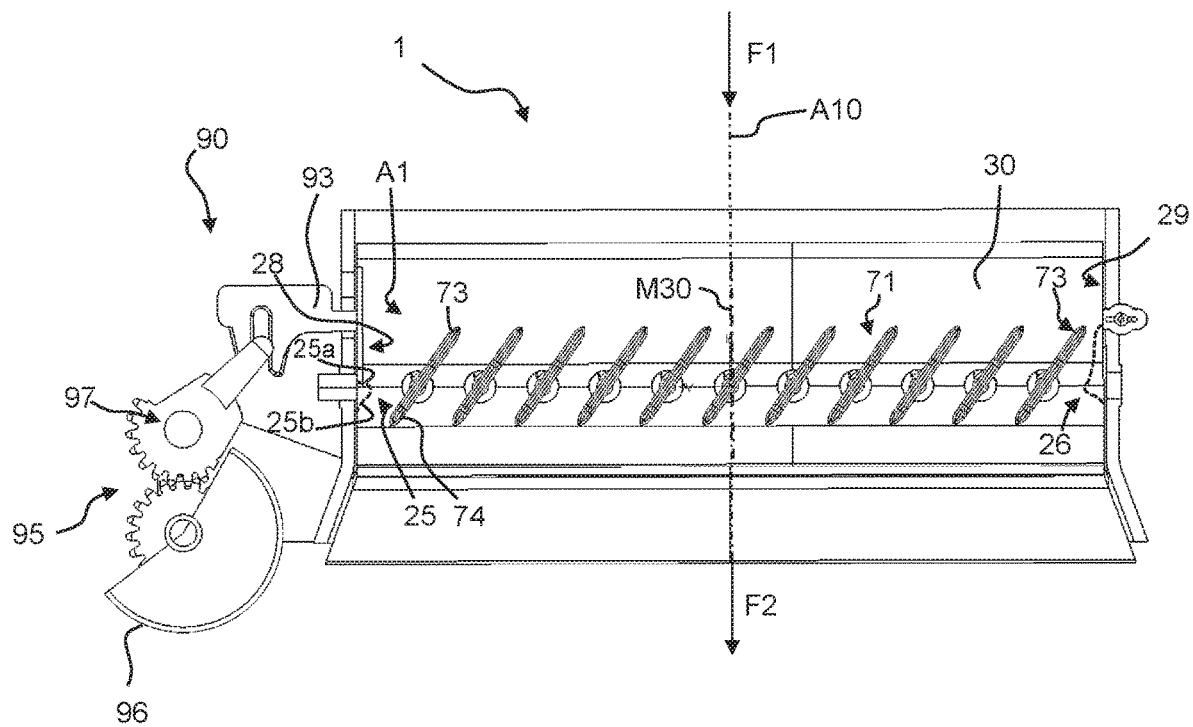
FIG. 7 shows the top view of FIG. 6 of the embodiment of the outlet device according to the invention of FIG. 2, wherein the vertical fins are in a first lateral deflection position.
Figure 8:
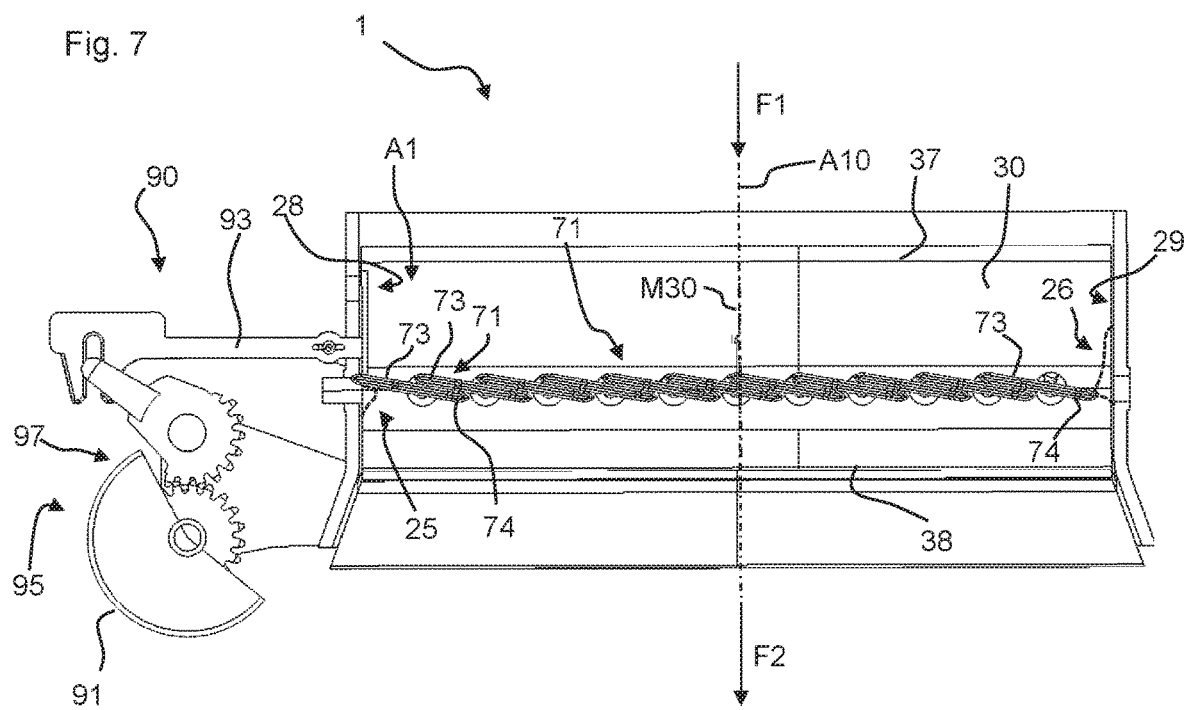
FIG. 8 shows the top view of FIG. 6 of the embodiment of the outlet device of FIG. 2, wherein the vertical fins are in a fin rotation position in which a flow through is prevented.
Figure 9:
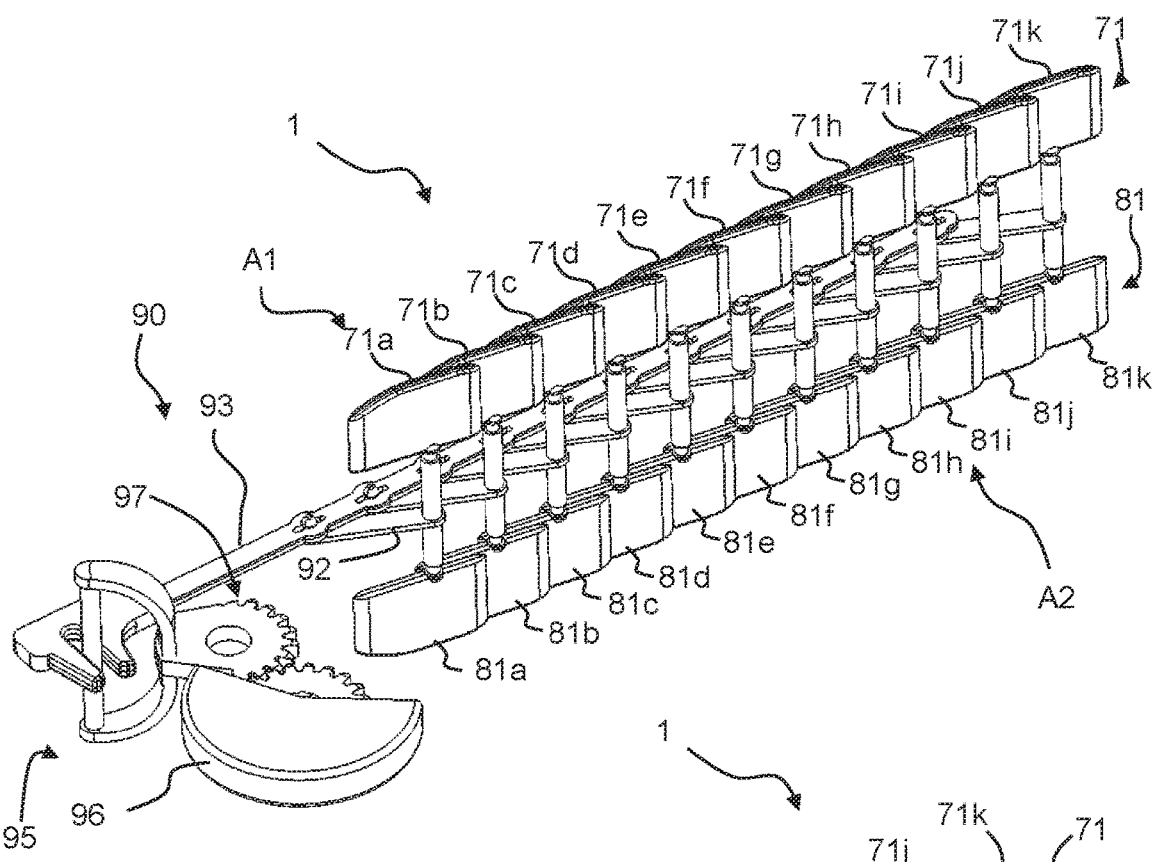
FIG. 9 is a perspective view of the fin arrangement of the embodiment of the outlet device of FIG. 2 with a fin adjustment device as seen from a front side corresponding to the outlet side, with the fins in a fin rotation position which the same abut one another to prevent a flow.
Figure 10:
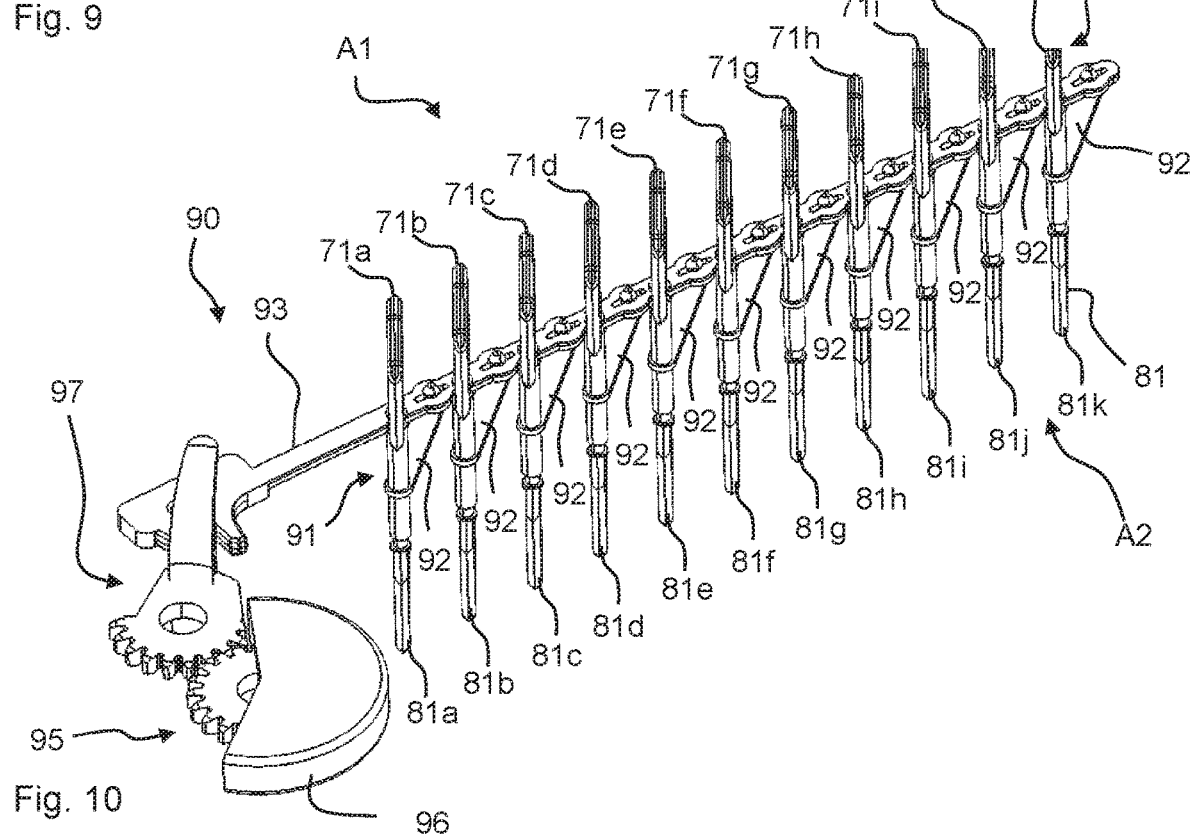
FIG. 10 is a perspective view of the fin arrangement of the embodiment of the outlet device of FIG. 2 with a fin adjustment device viewed from a front side corresponding to the inlet side, with the fins in a fin rotational position directing a flow.
Figure 11:
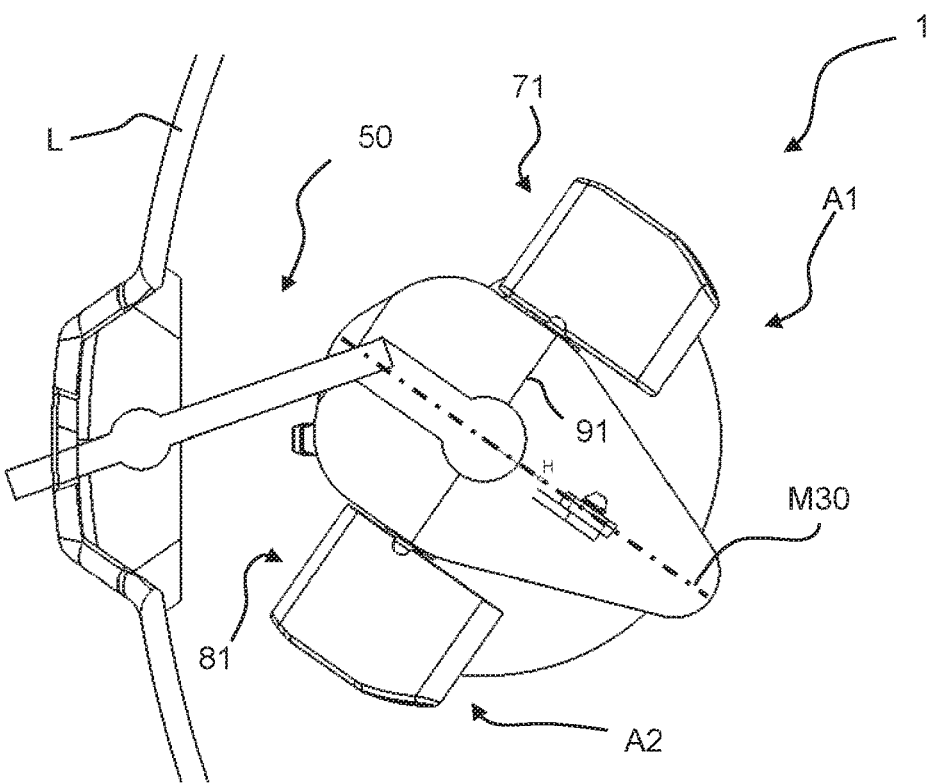
FIG. 11 is a side view of the central body and the fin arrangement and a central body adjustment device of the embodiment of the outlet device of FIG. 2, wherein the central body is in a first central body rotation position.
Figure 12:
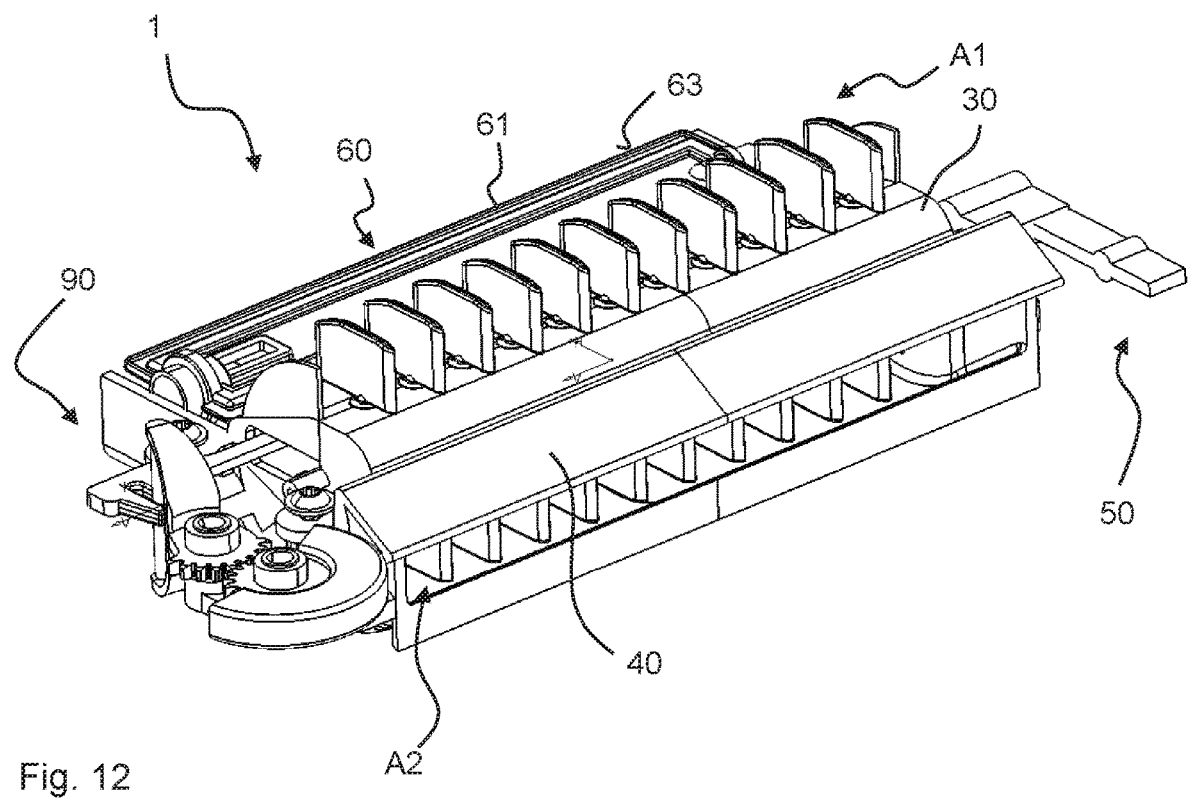
FIG. 12 shows a perspective view of a further embodiment of the outlet device without the housing, which, compared to the embodiment shown in FIG. 2, comprises a closing flap located between the air inlet opening and the air outlet opening, with the central body of the outlet device being in a neutral central body rotational position according to FIG. 4 and the closing flap in an open rotational position.
Figure 13:
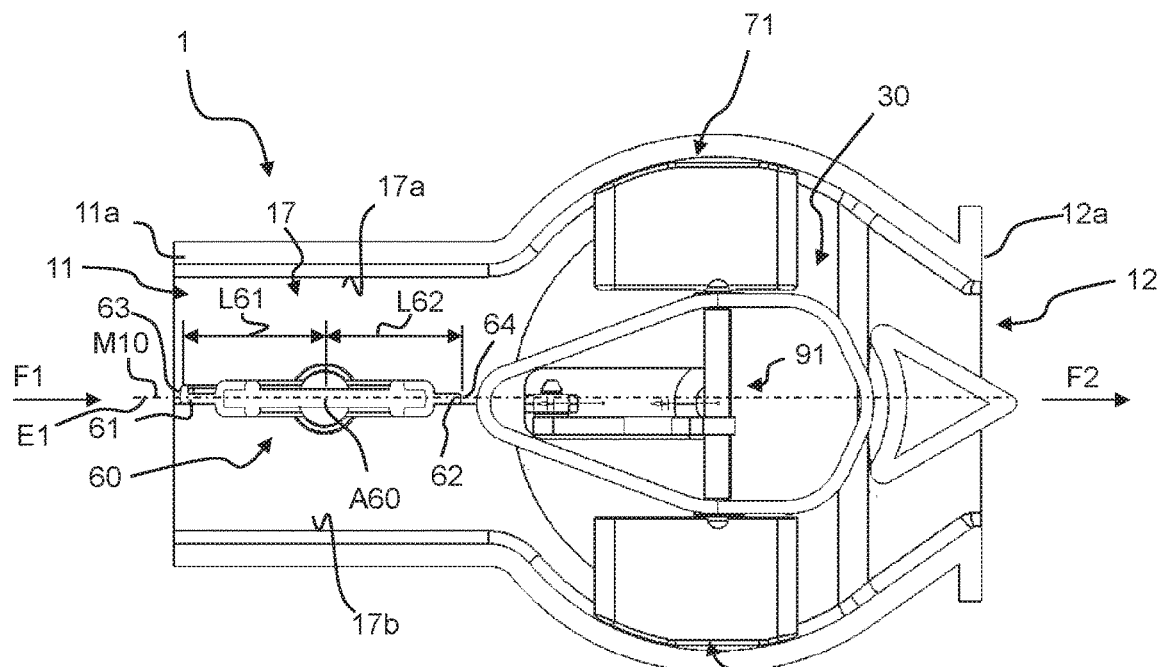
FIG. 13 shows a cross-sectional view of the further embodiment of the outlet device according to FIG. 12, with the central body of the outlet device being in the neutral central body rotational position according to FIG. 12 and the closing flap in the neutral rotational position according to FIG. 12.
Figure 14:
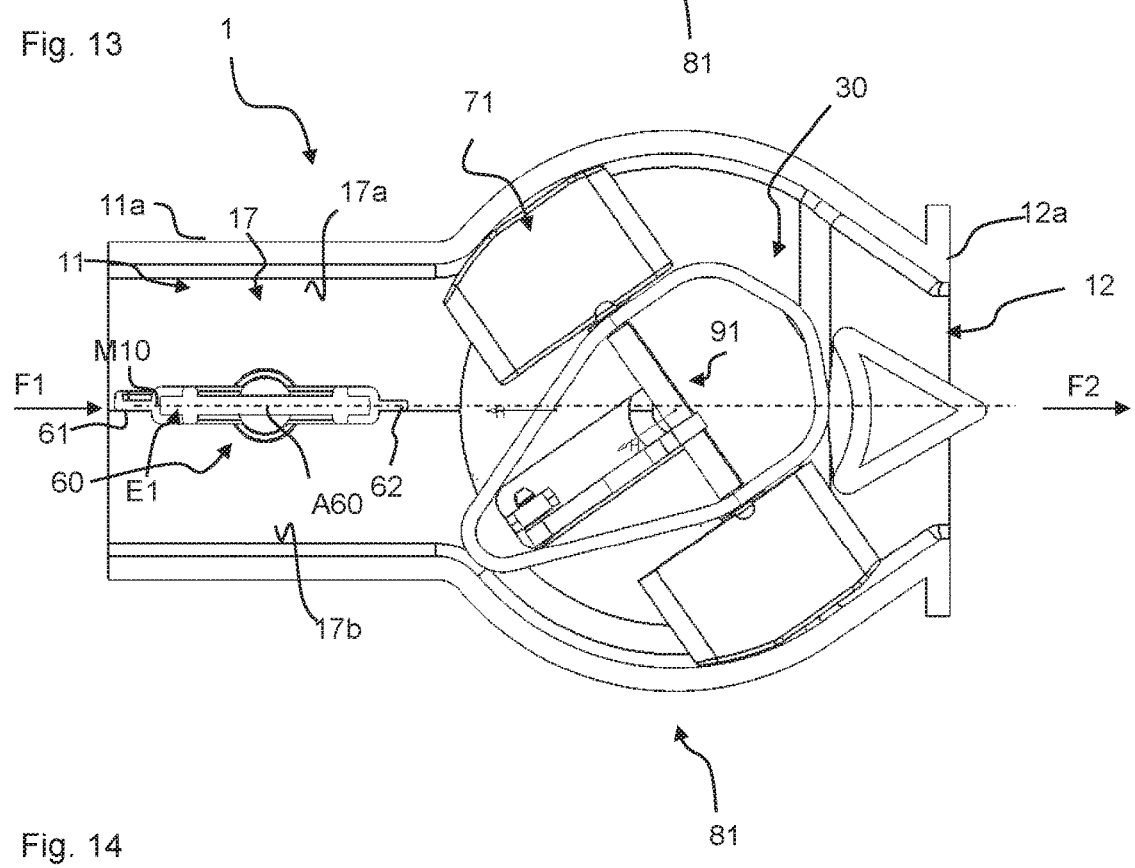
FIG. 14 shows a sectional view of the embodiment of the outlet device according to FIG. 13, wherein the central body of the outlet device is in the first deflected central body rotational position according to FIG. 5.
Figure 15:
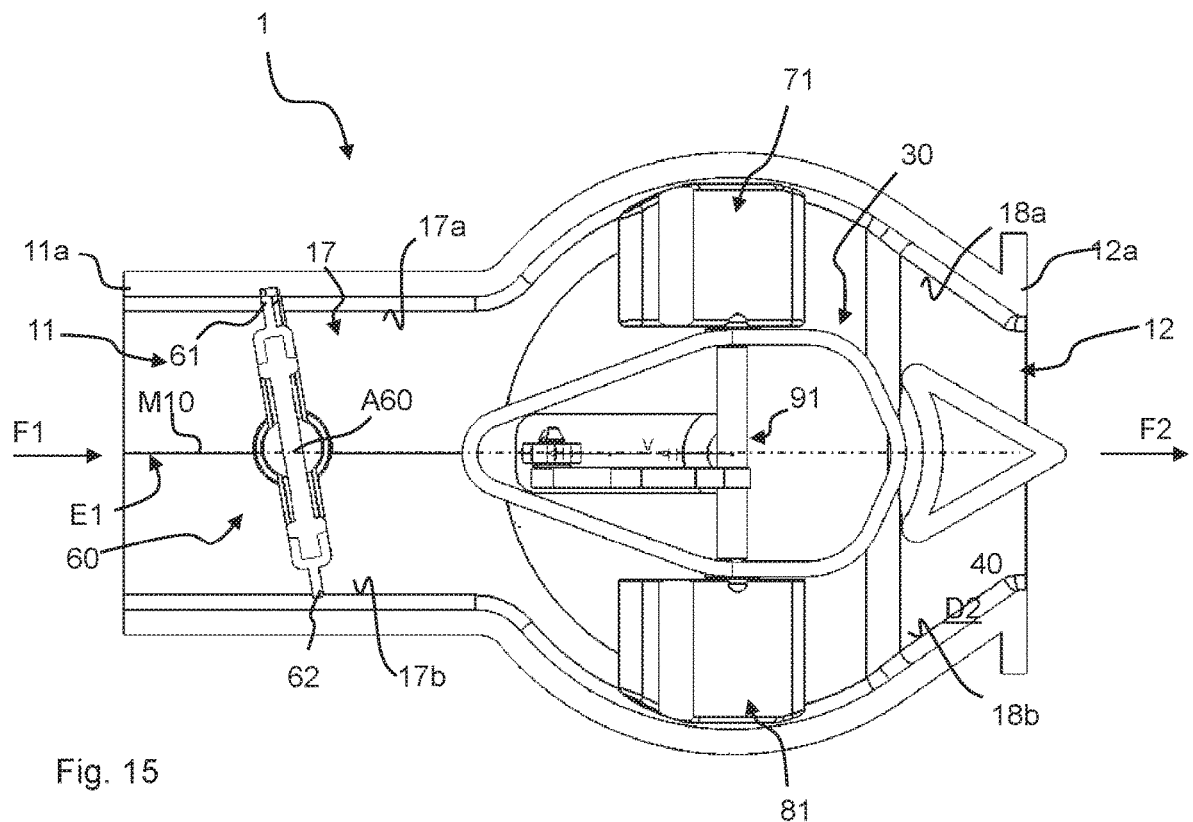
FIG. 15 shows a sectional view of the embodiment of the outlet device according to FIG. 14, wherein the closing flap is in a closing position, in which edge portions of the closing flap which lie contrary to each other abut against the inner housing surface for closing the channel.
Figure 16:
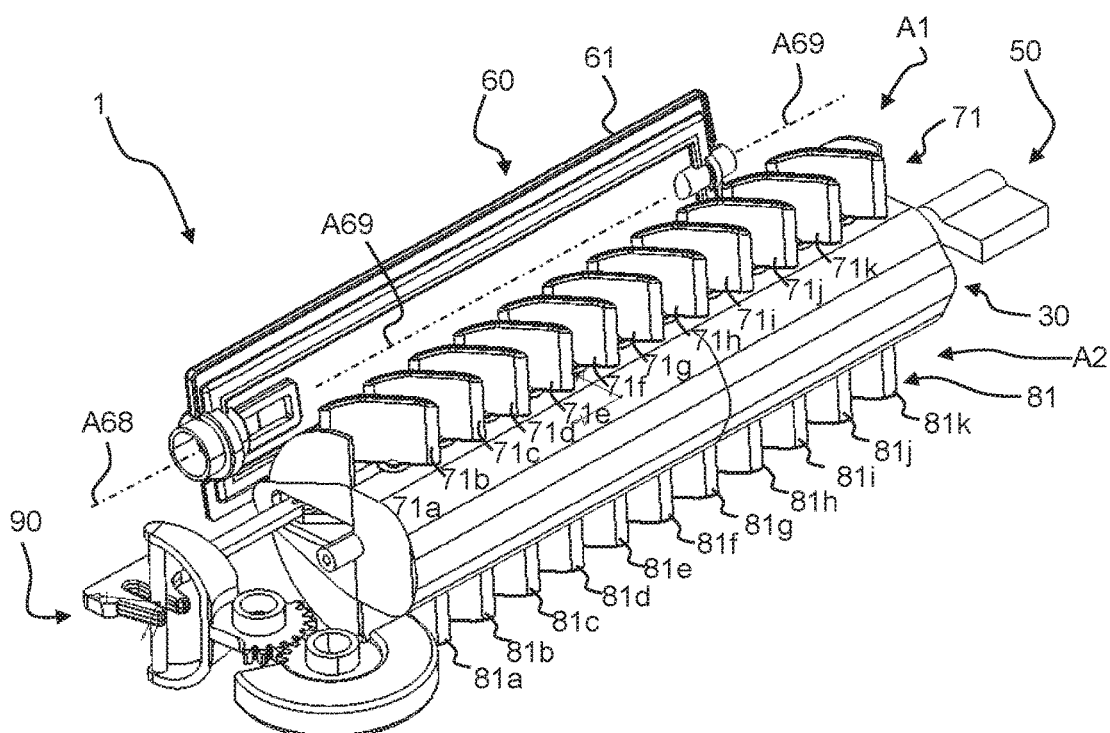
FIG. 16 shows a perspective view of a further embodiment of the outlet device according to FIG. 13 without the housing, wherein, compared to FIG. 13, the vertical fins are in a second lateral deflection position and wherein the closing flap is in the outermost deflected closing flap rotational position of FIG. 15.
Figure 17:
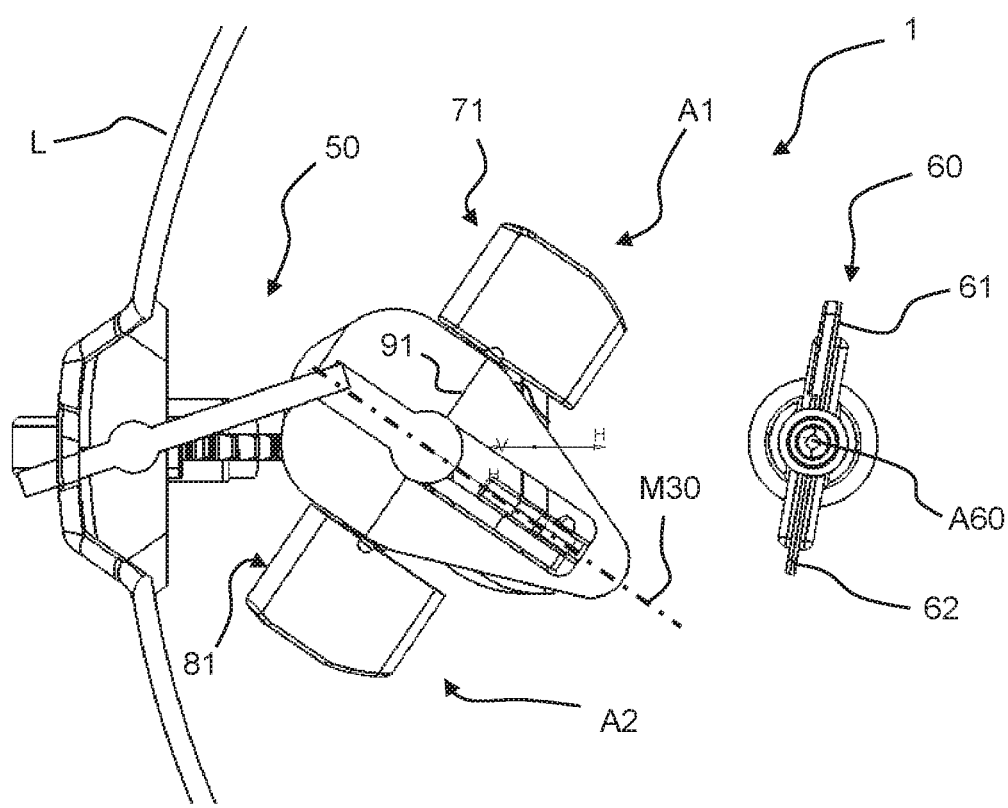
FIG. 17 is a side view of the central body and the fin arrangement and a central body adjustment device of the embodiment of the outlet device of FIG. 2, wherein the central body is in the first central body rotation position and wherein the closing flap is in the outermost deflected closing flap rotational position of FIG. 15.

In FIGS. 6 to 8 different rotational positions of the fins on the basis of the first arrangement A1 of fins 71 are shown. The features of the same can also be features of the second arrangement A2 of fins 81. In rotational positions in which fins 71 which are juxtaposed transversely to the housing center line M10 let pass the inlet flow F1, they do not divert the inlet flow F1 in a neutral position (FIG. 6) or, in a deflection position, deflect the inlet flow F1 with respect to the housing center line M10 laterally (FIG. 7).

In case that the first arrangement A1 and the second arrangement A2 each comprises several fins 71 and 81, respectively, it can be provided in particular, the respective fin 71, 81 or the respective flow-influencing part 76 and 86, respectively, of the respective fin 71 and 81, may be formed from a first side region 73 and 83, respectively, extending from the respective fin rotation axis 72 and 82, respectively, towards the air inlet opening 11 and a second side region 74 and 84, respectively, extending from the respective fin rotation axis 72 towards the outlet opening 12. The lengths L73 and L74 of the side regions 73 and 83, respectively, and the lengths L83 and L84 of the side regions 83 and 84, respectively, each of which extend vertically to the fin rotation axis 72 and 82, respectively, and the distances D71, D81 of respective adjacent fins 71 and 81, respectively, each of which extend vertically to the housing center line M10 can be designed in such a way that, in furthest deflected rotational positions of the fins 71 and 81, respectively, of the fin arrangements A1, A2 in each case a first side region 73 and 83, respectively, and a second side region 74 and 84, respectively, of fins each of which are disposed transverse to the housing centerline M10 adjacent to each other abut each other (FIG. 8).

Thereby, in these furthest deflected rotational positions, a complete or at least a maximum obstruction of the air flow through the first sub-channel C1 and the second sub-channel C2 is possible. For this purpose, the side wall portions 28 and 29 may each have a first bulge 25 and a second bulge 26, respectively, which can have a concave shape seen in particular from the housing center line M10. This option is shown in the FIGS. 6 to 8 with dashed lines. The first bulge 25 may in particular be designed in such a way that the one fin which is disposed closest to the first bulge 25 (FIG. 6: fin 71a), in its most deflected positions, with an outer edge section of the first side region 73 and with an outer edge section of the second side region 74, respectively, abut against the first bulge 25. To this purpose, the first bulge 25 may include a first surface portion 25a which lies closer to the inlet opening 11 and a second surface portion 25b which lies closer to the exit opening 12, located laterally of an apex portion 25c which lies closest to the housing centerline M10, wherein the distance between the first surface portion 25a and the housing center line M10 increases from the apex portion 25c toward the inlet opening 11 and wherein the distance between the second surface portion 26a and the housing center line M10 increases away from the apex portion 25c toward the outlet opening 12. It can thereby be achieved that, in the most widely deflected rotational positions, the abutment of at least 50% of the outer edge section of the first side region 73 on the first surface section 25a and of at least 50% of the outer edge section of the second side region 74 on the second surface section 25b is provided and at these positions, a flow of air is reduced or prevented. Similarly, the second bulge 26 may in particular be designed in such a way that the one fin which is disposed closest to the second bulge 26 (FIG. 6: fin 71a), in its most deflected positions, with an outer edge section of the first side region 73 and with an outer edge section of the second side region 74, respectively, abut against the second bulge 26. To this purpose, the second bulge 26 may include a first surface portion 26a which lies closer to the inlet opening 11 and a second surface portion 26b which lies closer to the exit opening 12, located laterally of an apex portion 26c which lies closest to the housing centerline M10, wherein the distance between the first surface portion 26a and the housing center line M10 increases from the apex portion 26c toward the inlet opening 11 and wherein the distance between the second surface portion 26a and the housing center line M10 increases away from the apex portion 26c toward the outlet opening 12. It can thereby be achieved that, in the most widely deflected rotational positions, the abutment of at least 50% of the outer edge section of the first side region 73 on the first surface section 26a and of at least 50% of the outer edge section of the second side region 74 on the second surface section 26b is provided and at these positions, a flow of air is reduced or prevented.

The outlet device 1 can comprise a central body adjustment device 50 which is coupled to the central body 30. The central body adjustment device 50 is configured such that with an actuation movement of the central body adjustment device 50 the central body 30 is rotated around an axis which extends transversely to the housing center line M10. The central body adjustment device 50 can comprise a central body adjustment lever 51 which is connected to the central body 30 in a non-rotational manner.

FIG. 4 shows a neutral position of the central body 30, in which the volume flows flowing through a first outlet sub-section D1 and a second outlet section D2, respectively, have the same size. In FIG. 1, in order to illustrate the course and the direction of the first partial air flow occurring along the housing center line A10 in the first sub-channel C1 with first outlet sub-section D1, a first flow line 3 extending in the direction of the housing center line M10 is shown. Furthermore, in order to illustrate the course and the direction of the second partial air flow occurring along the housing center line A10 in the second sub-channel C2 with second outlet section D2, a second flow line 4 extending in the direction of the housing center line M10 is shown. The direction of the first flow line 3, which results in the air outlet opening 12, is provided in FIG. 1 by reference numeral 5 and the direction of the second flow line 4, which results in the air outlet opening 12, is provided in FIG. 1 with reference numeral 6. The directions 5, 6 of the flow lines 3 and 4, respectively, meet at an intersection point P located within the intersection area B. The intersection area B is herein defined as the region of the first reference plane E1 in which the directions of all the flow lines of the first and second sub-channels C1, C2 at the location of the air outlet opening 12 intersect the first reference plane E1.

In the neutral position of the central body 30 shown in FIG. 1, the outlet flow F1 exiting the air outlet opening 12 has a neutral direction, i.e. the same extends in the direction of the extent of the first reference plane E1.

Figure 5:
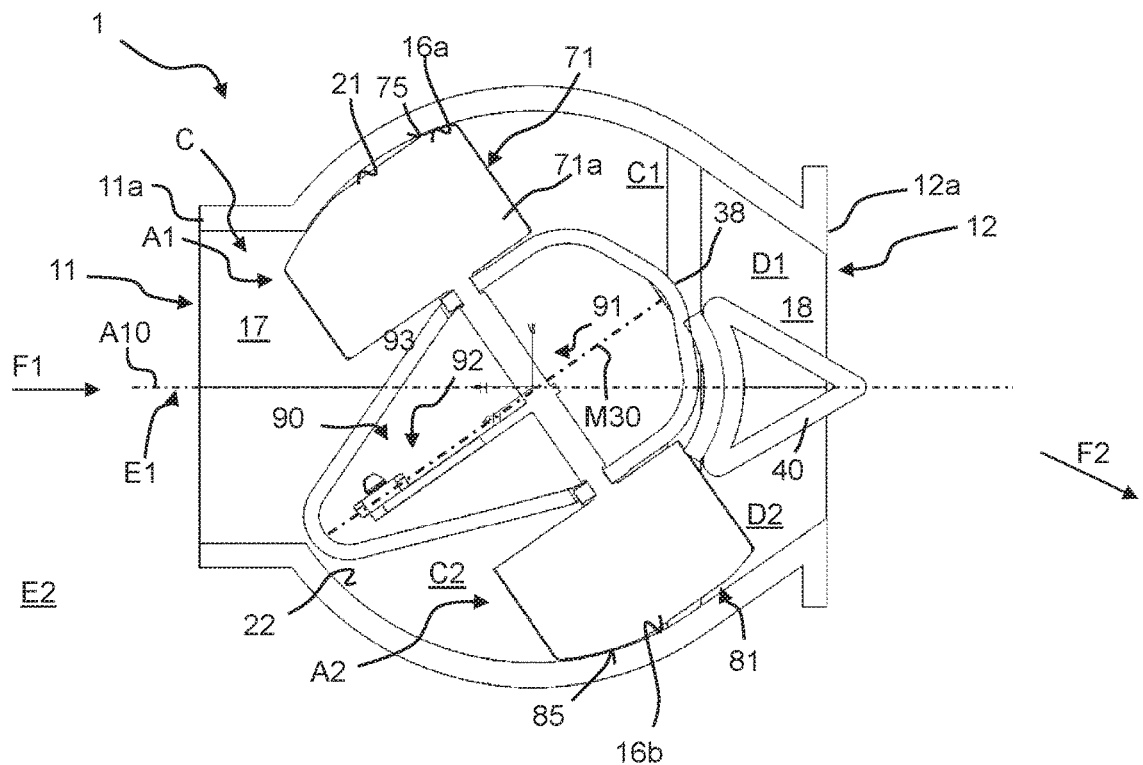
FIG. 5 shows a sectional view of the embodiment of the outlet device according to the invention of FIG. 2, wherein the central body of the outlet device is in a first deflected central body rotational position.

FIG. 5 shows the outlet device 1 with a rotational position of the central body 30, in which the central body 30 is rotated against the clockwise direction with regard to the neutral rotational position of the central body 30 according to FIG. 4 in the plan view thereof. As a result, the volume flow occurring in the first sub-channel C1 of the channel C is increased in relation to the volume flow occurring in the second sub-channel C2 of the channel C, so that the outlet flow is deflected relative to the direction of the housing center line M10 to the side the second outlet subsection D2. In a rotational position of the central body 30 that is in between the one of FIG. 4 and the one of FIG. 5, the outlet flow F2 will have a direction that is more inclined to the first reference plane E1 than the outlet flow F2 in FIG. 5.

The outlet device 1 can comprise a rotational position of the central body 30, in which the central body 30 is rotated in the clockwise direction with regard to the neutral rotational position of the same according of FIG. 4. Thereby the volume flow occurring in the second sub-channel C2 of the channel C is increased in relation to the volume flow entering the first sub-channel C1 of the channel C, so that the outlet flow F2 undergoes a deflection relative to the direction of the housing center line M10 to the side the first outlet subsection D1 and therefore to a different side compared to the state of FIG. 5.

In the embodiments of the exhaust device 1 according to the invention, as shown in FIGS. 12 to 17, each may optionally comprise a closing flap 60 located in front of the central body 30, viewed from the air inlet 11. The closing flap 60 is rotatably mounted in the channel C in and particularly to in the housing 10 and is rotatable around a closing flap rotation axis A60 running along the first reference plane E1 and transversely to the housing center line M10. The closing flap 60 is arranged in the inlet section 17 and allows the closing of the inlet opening 11 or at least allows a significant reduction of the air flow through the channel C. An advantage of such an additional closing flap is, that the fins 71 and 82 and inner housing wall need not to be configured to allow a closing of the channel C.

In the embodiments with sidewall portions 28, 29, the closing flap 60 may comprise a first outer side edge portion 68 which faces the first sidewall portion 28 and a second outer side edge portion 69 which faces the second sidewall portion 29. In this case, the first outer side edge portion 68 may be coupled to the first side wall section 28 via a first axle section A68 and the second outer side edge portion 69 may be coupled to the second side wall portion 29 via a second axle section A69. The first axle section A68 may be rotationally fixed to the first side wall portion 28 or the first outer side edge portion 68, the first axle portion A68 being rotatably coupled to the first outer side edge portion 68 and the first side wall portion 28, respectively. Similarly, the second axle section A69 may be rotationally fixed to the second side wall portion 29 or the second outer side edge portion 69, the second axle portion A69 being rotatably coupled to the second outer side edge portion 69 and the second side wall portion 29, respectively.

The axle sections A68 and A69 define the direction of the closing flap rotation axis A60. The closing flap 60 may include a first side portion 61 extending in a first direction from the closing flap rotation axis A60 and a second side portion 62 extending in a second direction from the closing flap rotation axis A60, wherein the second direction runs opposite to the first direction. The first side portion 61 comprises a first outer longitudinal edge portion 63 extending along the adjustment flap rotation axis A60, The second side portion 62 comprises a second outer longitudinal edge portion 64 which extends along the adjustment flap rotation axis A60. The respective shortest distance L61 between points of the adjustment flap rotation axis A60 and points of the first outer longitudinal edge section 63 may be constant along the closing flap rotation axis A60 or variable. Analogously, the shortest distance L62 between points of the closing flap rotation axis A60 and points of the second outer longitudinal edge section 64 along the closing flap rotation axis A60 may be constant or variable. The variable distance is preferred particularly in case the cross-section of the inlet section 17 varies in the direction parallel to the rotation axis of the closing flap.

According to one embodiment, it is provided that the distance L61 seen along the adjustment flap rotation axis A60 is greater than the distance L62. In this case, the side portions 61 and 62 can be designed in such a way and the distances L61 and L62 can be provided such that in a outermost deflected rotational position of the adjustment flap 60 (FIG. 8) the first side portion 61 or the first longitudinal edge section 63 abuts the first inner surface section 21 and the second side portion 62 or the second longitudinal edge portion 64 abuts the second inner surface portion 22. The abutment of the first side portion 61 or the first longitudinal edge portion 63 on the first inner surface portion 21 and the abutment of the second side portion 62 or the second longitudinal edge portion 64 on the second inner surface portion 22 may be realized over at least 50% of the extent of respective longitudinal edge portion 63 and 64 along the closing flap rotation axis A60. As a result, the closing flap 60 in its outermost deflected rotational position can greatly reduce or prevent flow of the inlet flow F1 through the first sub-channel C1 and the second sub-channel C2.

The closing flap 60 may be coupled to an closing flap actuation device S60, with which the rotational position of the closing flap 60 can be adjusted manually or due to an electric control via an actuator.

Although it is preferred that the housing 10 and the central body 30 in its neutral position are symmetric with respect to the first reference plane E1, in other embodiments they may be asymmetric for example to have a preferred direction of the airflow exiting the outlet device 1.

The invention claimed is:

1. An outlet device for ventilating a vehicle interior by generating an outlet flow, the outlet device comprising:
   a housing which extends along a housing centerline between an air inlet opening and an air outlet opening and which comprises a first inner surface section and a second inner surface section opposite thereto with regard to a first reference plane,
   a central body which is rotatably mounted to the housing and is rotatable around a central body rotation axis running along the first reference plane, wherein the central body comprises a first air-guide surface and a second air-guide surface which is oriented contrary to the first air-guide surface, wherein the first and second air-guide surfaces each extend along a central body center line, wherein the first air-guide surface lies opposite to the first inner surface section and forms with the same a first sub-channel which defines a first partial volume flow direction which exits at the air outlet opening, wherein the second air-guide surface lies opposite to the second inner surface section and forms with the same a second sub-channel which defines a second partial volume flow direction which exits at the air outlet opening, wherein the first partial volume flow direction and the second partial volume flow direction meet each other in a deflection area lying behind the central body when viewed from the air inlet opening,
   a first arrangement of at least one fin, each of which extends from the first air-guide surface and is rotatably hinged to the central body and is rotatable around a respective first fin rotation axis which extends from the first air-guide surface, and
   a second arrangement of at least one fin, each of which extends from the second air-guide surface and is rotatably hinged to the central body and is rotatable around a respective second fin rotation axis which extends from the second air-guide surface,
   wherein a respective adjustment lever protrudes from each of at least two axles, thereby forming an off-axis end portion of each lever,
   wherein one fin of the first arrangement is disposed at an end part of each axle in a non-rotational manner, and one fin of the second arrangement is disposed at another end part of each axle in a non-rotational manner,
   wherein each axle extends transversely to the central body rotation axis and is rotatably coupled to the central body, and
   wherein the end portion of each adjusting lever is rotatable coupled to a connecting rod to synchronously rotate the fins.

2. The outlet device according to claim 1, wherein the first fin rotation axis and the second fin rotation axis run parallel or co-axial to each other.

3. The outlet device according to claim 1,
   wherein multiple fins of the first arrangement each have a fin edge section facing the first inner surface section, wherein the first inner surface section comprises a fin movement section which covers the range of movement of the fin edge section in all rotational positions of both the fins and the central body and which is concavely curved as seen from the inside of the housing forming a concave bulge along which the tin edge sections of the respective fin move within its range of movement upon rotation of the central body around the central body rotation axis, and
   wherein the fins of the second arrangement each have a fin edge section facing the second inner surface section, wherein the second inner surface section comprises a fin movement section which covers the range of movement of the fin edge section in all rotational positions of both the fins and the central body and which is concavely curved as seen from the inside of the housing forming a concave bulge along which the fin edge sections of the respective fin move within its range of movement upon rotation of the central body around the central body rotation axis.

4. The outlet device according to claim 1, wherein the housing comprises an inlet section with the air inlet opening and an outlet section with the air outlet opening, wherein the first inner surface section in the outlet section comprises a first end portion at the air outlet opening and the second inner surface section of the outlet section comprises a second end portion at the air outlet opening, wherein fictive extensions of the first and second end portions are directed towards each other.

5. The outlet device according to claim 1, wherein the outlet device comprises a central body adjustment device which is coupled to the central body for rotating the central body around the central body rotation axis.

6. The outlet device according to claim 1, wherein the central body extends transversely across the entire housing interior from a first side wall section to a second side wall section which lies opposite to the first side wall section, and is rotatable relative to the side wall sections.

7. The outlet device according to claim 1,
   wherein the central body comprises an end which faces the outlet opening and which is located in a distance from the outlet opening over which distance an outlet section extends, and wherein a flow separator device is disposed in the outlet section and extends as an extension from the central body in order to separate the air flow of the first sub-channel from the air flow of the second sub-channel in the area of the outlet section.

8. The outlet device according to claim 1, wherein the outlet device comprises a closing flap which is rotatably mounted in the housing and which is rotatable around a closing flap rotation axis running along the first reference plane and transversely to the housing center line.

9. An outlet device for ventilating a vehicle interior by generating an outlet flow, the outlet device comprising:
- a housing which extends along a housing centerline between an air inlet opening and an air outlet opening and which comprises a first inner surface section and a second inner surface section opposite thereto with regard to a first reference plane,
- a central body which is rotatably mounted to the housing and is rotatable around a central body rotation axis running along the first reference plane, wherein the central body comprises a first air-guide surface and a second air-guide surface which is oriented contrary to the first air-guide surface, wherein the first and second air-guide surfaces each extend along a central body center line, wherein the first air-guide surface lies opposite to the first inner surface section and forms with the same a first sub-channel which defines a first partial volume flow direction which exits at the air outlet opening, wherein the second air-guide surface lies opposite to the second inner surface section and forms with the same a second sub-channel which defines a second partial volume flow direction which exits at the air outlet opening, wherein the first partial volume flow direction and the second partial volume flow direction meet each other in a deflection area lying behind the central body when viewed from the air inlet opening,
- a first arrangement of at least one fin, each of which extends from the first air-guide surface and is rotatably hinged to the central body and is rotatable around a respective first fin rotation axis which extends from the first air-guide surface, and
- a second arrangement of at least one fin, each of which extends from the second air-guide surface and is rotatably hinged to the central body and is rotatable around a respective second fin rotation axis which extends from the second air-guide surface, wherein the first arrangement of at least one fin comprises at least two parallel fins and the second arrangement of the at least one fin comprises at least two parallel fins.

10. The outlet device according to claim 9, wherein the parallel fins of each arrangement extend vertically and are horizontally spaced apart from each other.

* * * * *